United States Patent
Zhu et al.

(10) Patent No.: US 12,521,874 B2
(45) Date of Patent: Jan. 13, 2026

(54) PARALLEL ROBOT SYSTEM

(71) Applicant: BEIJING ROSSUM ROBOT TECHNOLOGY CO., LTD, Beijing (CN)

(72) Inventors: Gang Zhu, Beijing (CN); Wei Tian, Beijing (CN); Kewen Mu, Beijing (CN); Chuan Bai, Beijing (CN); Ke Xu, Beijing (CN); Xiangrui Zhao, Beijing (CN)

(73) Assignee: BEIJING ROSSUM ROBOT TECHNOLGOY, CO., LTD., Beijing (CN)

( * ) Notice: Subject to any disclaimer, the term of this patent is extended or adjusted under 35 U.S.C. 154(b) by 315 days.

(21) Appl. No.: 18/548,280

(22) PCT Filed: May 5, 2022

(86) PCT No.: PCT/CN2022/090968
§ 371 (c)(1),
(2) Date: Aug. 29, 2023

(87) PCT Pub. No.: WO2023/137925
PCT Pub. Date: Jul. 27, 2023

(65) Prior Publication Data
US 2024/0131697 A1   Apr. 25, 2024
US 2024/0227178 A9   Jul. 11, 2024

(30) Foreign Application Priority Data

Jan. 19, 2022 (CN) .......................... 202210060033.X (51) Int. Cl.
*B25J 9/16* (2006.01)
*A61B 90/50* (2016.01)
(Continued)

(52) U.S. Cl.
CPC ............. *B25J 9/1623* (2013.01); *A61B 90/50* (2016.02); *B25J 9/106* (2013.01); *B25J 9/12* (2013.01);
(Continued)

(58) Field of Classification Search
CPC ... B25J 9/12; B25J 9/106; B25J 9/1623; B25J 9/1697; B25J 19/021; A61B 34/20; A61B 2034/304; A61B 2034/2055; A61B 90/50
See application file for complete search history.

(56) References Cited

U.S. PATENT DOCUMENTS

| 4,491,435 A * | 1/1985 | Meier | ................ F16M 11/2078 403/56 |
| 2021/0236207 A1 | 8/2021 | Stanton | |

FOREIGN PATENT DOCUMENTS

| CN | 102429726 A | 5/2012 | |
| CN | 105499796 A * | 4/2016 | ............ B25J 9/0036 |

(Continued)

*Primary Examiner* — William C Joyce
(74) *Attorney, Agent, or Firm* — FISHERBROYLES, LLP; Roger L. Browdy; Ronni S. Jillions (57) ABSTRACT

A parallel robot system, including: a control apparatus; a parallel robot, including a mounting base, a moving platform, and a driving apparatus arranged between the mounting base and the moving platform, where the driving apparatus is configured to drive the moving platform to make multi-degree-of-freedom movement relative to the mounting base, and the driving apparatus receives a control signal from the control apparatus; a tracer, arranged on the moving platform; a passive arm, where the mounting base of the parallel robot is connected to one end of the passive arm; and an optical positioning and tracking apparatus, configured to track a spatial position of the tracer in real time and to send spatial position data of the tracer to the control apparatus. The parallel robot system is small in size and convenient to (Continued)

mount, and can provide various functions of auxiliary punching, implantation, positioning and the like.

8 Claims, 5 Drawing Sheets

(51) Int. Cl.
    *B25J 9/10*          (2006.01)
    *B25J 9/12*          (2006.01)
    *A61B 34/20*        (2016.01)
    *A61B 34/30*        (2016.01)

(52) U.S. Cl.
    CPC ............. *B25J 9/1697* (2013.01); *A61B 34/20* (2016.02); *A61B 2034/2055* (2016.02); *A61B 2034/304* (2016.02)

(56) References Cited

FOREIGN PATENT DOCUMENTS

| CN | 108015808 | A | * | 5/2018 | ............ G06F 30/20 |
|----|-----------|---|---|--------|-------------------------|
| CN | 109350241 | A |   | 2/2019 |                         |
| CN | 209269875 | U |   | 8/2019 |                         |
| CN | 110815206 | A | * | 2/2020 | ............ B25J 9/1692 |
| CN | 111012499 | A |   | 4/2020 |                         |
| CN | 210811697 | U |   | 6/2020 |                         |
| CN | 112754670 | A |   | 5/2021 |                         |
| CN | 112775938 | A | * | 5/2021 | ............. B25J 9/126 |
| CN | 114179121 | A |   | 3/2022 |                         |

* cited by examiner

PARALLEL ROBOT SYSTEM

TECHNICAL FIELD

The present invention belongs to the technical field of intelligent medical instruments, and relates to surgical robot technologies, in particular to a parallel robot system and a control method therefor.

BACKGROUND

At present, surgical robots have been increasingly applied in clinical surgeries to assist doctors in completing complex surgeries. For example, the surgical robots can accurately associate image data of patients with their physiological and anatomical structures to assist the doctors in performing surgical plans, and can guide the doctors to operate surgical instruments or independently complete certain surgical operations.

However, an existing surgical robot is large in size, and generally includes a plurality of devices such as a trolley, a passive arm, a front-end tool, a display device, and an upper computer operating platform. Moreover, there is limited space in an operating room, especially around an operating table. The operating table is surrounded by doctors, nurses, a surgical robot device, etc., resulting in cramped space and inconvenience for the doctors to operate freely. In this case, it is difficult to have space to accommodate the conventional surgical robot if the surgical robot is further required to complete other auxiliary work.

Therefore, a small parallel robot system that takes up little space and can complete various surgical operations or auxiliary work needs to be designed.

SUMMARY

To solve the above technical problems, the present invention provides a parallel robot system, including:
a control apparatus;
a parallel robot, including a mounting base, a moving platform, and a driving apparatus arranged between the mounting base and the moving platform, where the driving apparatus is configured to drive the moving platform to make multi-degree-of-freedom movement relative to the mounting base, and the driving apparatus receives a control signal from the control apparatus;
a tracer, arranged on the moving platform;
a passive arm, where the mounting base of the parallel robot is connected to one end of the passive arm; and
an optical positioning and tracking apparatus, configured to track a spatial position of the tracer in real time and to send spatial position data of the tracer to the control apparatus.

Further, the parallel robot system further includes a passive arm, including:
an upper arm and a front arm;
a first joint structure, where the upper arm and the front arm are articulated together by the first joint structure;
a second joint structure, arranged at an end of the upper arm and/or an end of the front arm;
a first driving mechanism, arranged in the upper arm; and
a second driving mechanism, arranged in the front arm, wherein the mounting base of the parallel robot is connected to the end of the front arm of the passive arm.

Further, the first joint structure includes a first force amplification apparatus and a first locking element, the second joint structure includes a second force amplification apparatus and a second locking element, and the first driving mechanism and the second driving mechanism apply an acting force to the first locking element and/or the second locking element by the first force amplification apparatus and/or the second force amplification apparatus.

Further, the first force amplification apparatus and/or the second force amplification apparatus are/is of a lever type structure.

Further, the first driving mechanism and the second driving mechanism are electric push rods and are electrically connected to the control apparatus.

Further, the driving apparatus includes six telescopic apparatuses;
three support points are formed on the mounting base and the moving platform, respectively, and the three support points are arranged in a triangular shape; and
the six telescopic apparatuses are grouped in pairs, and each group of the telescopic apparatuses has one end articulated to one of the three support points of the mounting base and the other end articulated to adjacent two of the support points of the moving platform, respectively, and is arranged in a triangular shape.

Further, the telescopic apparatuses are electric push rods, each of the electric push rods includes a micro servo motor, and the micro servo motor is electrically connected to the control apparatus.

Further, the parallel robot system further includes a display screen arranged on the parallel robot and electrically connected to the control apparatus.

Further, the tracer includes a bracket and a plurality of optical indication points arranged on the bracket.

Further, the plurality of optical indication points are small balls emitting or reflecting light and are located on a same plane; and
the plurality of optical indication points meet the requirements that a distance between two points is not less than 30 mm and a distance difference is not less than 5 mm.

The parallel robot system according to the present invention is small in size and convenient to mount, can be connected to various tools by a tool interface, and can provide various functions of auxiliary punching, implantation, positioning and the like. In addition, the parallel robot is used in cooperation with the passive arm, which improves the flexibility and usage space of the parallel robot. The tracer is arranged at a front end of the parallel robot, so that the spatial position of the parallel robot can be tracked in real time by using the optical positioning and tracking apparatus in the surgical robot system to implement precise positioning.

In addition to the technical problems solved by the present invention, the technical features of the formed technical solutions, and the advantages brought by the technical features of these technical solutions described above, other technical features of the present invention and the advantages brought by these technical features will be further described in conjunction with the accompanying drawings.

1. parallel robot; 2. moving platform; 3. mounting base; 4. telescopic apparatus; 5. ball joint hinge; 6. upper housing; 7. flexible housing; 8. lower housing; 9. display screen; 10. tool interface; 11. connecting piece; 12. mounting lead screw; 13. control switch; 14. bracket; 15. optical indication point; 16. operating table; 17. passive arm; 18. optical positioning and tracking apparatus; 19. ball joint pin; 20. first joint head; 21. second joint head; 22. articulated shaft; 23. first locking element; 24. first rotary shaft; 25. first force amplification rod; 26. slide block; 27. stop piece; 28. ejector block; 29. first driving apparatus; 30. spring; 31. upper arm; 32. front arm; 33. first joint structure; 34. second joint structure; 35. ball joint housing; 36. ball joint; 37. ball bowl; 38. second force amplification rod; 39. second rotary shaft; and 40. second driving apparatus.

DETAILED DESCRIPTION OF THE EMBODIMENTS

In the description of the present invention, it should be noted that the terms "mounted", "connected", and "connection" should be understood in a broad sense, unless otherwise explicitly specified and defined. For example, the "connection" may be a fixed connection, a detachable connection, or an integrated connection; also, the "connection" may be a mechanical connection or an electrical connection; and the "connected" may be direct connected, indirect connected via an intermediate medium, or communication between interiors of two elements. Those of ordinary skill in the art may understand the specific meanings of the above terms in the present invention according to the specific circumstances.

In addition, in the description of the present invention, "a plurality of" and "a plurality of groups" mean two or more, and "several" and "several groups" mean one or more, unless otherwise stated.

The present invention provides a parallel robot system, including:

a control apparatus;

a parallel robot, including a mounting base, a moving platform, and a driving apparatus arranged between the mounting base and the moving platform, where the driving apparatus is configured to drive the moving platform to make multi-degree-of-freedom movement relative to the mounting base, and the driving apparatus receives a control signal from the control apparatus;

a tracer, arranged on the moving platform;

a passive arm, where the mounting base of the parallel robot is connected to one end of the passive arm; and an optical positioning and tracking apparatus, configured to track a spatial position of the tracer in real time and to send spatial position data of the tracer to the control apparatus.

In the parallel robot system according to the present invention, the parallel robot is small in size, which saves space. The parallel robot is used in cooperation with the passive arm, which improves the flexibility and movement range of the parallel robot.

The passive arm includes: an upper arm and a front arm; a first joint structure, by which the upper arm and the front arm are articulated together; a second joint structure, arranged at an end of the upper arm and/or an end of the front arm; a first driving mechanism, arranged in the upper arm; and a second driving mechanism, arranged in the front arm.

When second joint structures in the present invention are arranged at two ends of the passive arm, a first driving apparatus and a second driving apparatus provide locking forces for the second joint structures at the two ends, respectively. In this case, the passive arm has at least six degrees of freedom, allowing it to provide flexible movement of surgical tools in space with arbitrary degree of freedom. After the passive arm reaches a suitable position, the driving mechanisms can quickly lock the passive arm as a whole and provide a larger locking load. Compared with conventional mechanical connection and locking, the advantages of more convenience in mounting and positioning, and faster locking are achieved.

Further, the tracer in the present invention is used in cooperation with the optical positioning and tracking apparatus, and the spatial position of the tracer is tracked in real time by the optical positioning and tracking apparatus, so that an accurate position of a tool at a front end of the parallel robot can be determined, and thus a path plan and a surgical operation can be performed.

Optionally, the moving platform of the parallel robot is a moving platform capable of making the multi-degree-of-freedom movement, and the driving apparatus is movable under the control of the control apparatus, so as to cause the moving platform to complete a predetermined movement trajectory. Various driving modes may be used, as long as the multi-degree-of-freedom movement of the moving platform can be implemented.

Preferably, the parallel robot may choose a six-degree-of-freedom moving platform, with a principle of including six actuating cylinders, six upper universal hinges, six lower universal hinges, an upper platform, and a lower platform, where the lower platform is fixed to a foundation. With the aid of telescopic movement of the six actuating cylinders, the moving platform completes six-degree-of-freedom (X, Y, Z, α, β, y) movement in space, so that various spatial movement attitudes can be simulated.

Further, the mounting base and the moving platform are of a star-shaped structure with three branches, and a support point is arranged on each branch, so that three support points are formed on the mounting base and the moving platform, respectively, and the three support points are arranged in a triangular shape.

Preferably, the driving apparatus includes six telescopic apparatuses grouped in pairs, and each group of the telescopic apparatuses has one end articulated to one of the three support points of the mounting base and the other end articulated to adjacent two of the support points of the moving platform, respectively, and is arranged in a triangular shape.

Further, ball joint hinges are arranged at two ends of the telescopic apparatus, and the telescopic apparatus is articulated to the mounting base and the moving platform by the ball joint hinges.

The telescopic apparatuses may be actuated electrically, hydraulically, pneumatically or in other form. In the present invention, electric push rods are used as the telescopic apparatuses. Each electric push rod includes an individual micro servo motor. The micro servo motor has a higher accuracy to ensure smooth and accurate movement. Each electric push rod is connected to the control apparatus for individual control. The position and attitude of the moving platform can be changed by changing the length of each electric push rod.

The parallel robot may have a housing, including an upper housing, a lower housing, and a flexible housing, where the upper housing is mounted outside the moving platform, the lower housing is mounted on the mounting base, and the flexible housing is arranged between the upper housing and the lower housing, so that the upper housing is movable relative to the lower housing. The parallel robot is small in size, preferably in the shape of a conical frustum. The upper housing has a diameter of 7-12 cm, and the lower housing 8 has a diameter of 11-16 cm and a height of less than 11-16 cm (excluding an interface height), so that small size is achieved.

Optionally, the tracer in the present invention may include a bracket and a plurality of optical indication points mounted on the bracket. Optionally, the bracket may be a hollow frame in the shape of an irregular polygon or a plurality of bifurcated structures. A plurality of mounting holes are arranged on the bracket and configured to mount the optical indication points. Preferably, the optical indication points are mounted on the bracket in a protruding manner, so as to expand the visible range photographed by the optical positioning and tracking apparatus.

Preferably, the plurality of optical indication points are located on a same plane, but not on a same straight line. Preferably, three or more optical indication points are arranged, so that the plane where the optical indication points are located can be determined. More preferably, four optical indication points are arranged, so that the spatial position of the tracer can be more accurately calculated and calibrated.

Preferably, the plurality of optical indication points meet the requirements that a distance between two points is not less than 30 mm and a distance difference is not less than 5 mm. The optical indication points may be small balls emitting or reflecting light, with a diameter of 5-20 mm.

Optionally, the tracer may be directly arranged on the moving platform, or is detachably mounted on the moving platform by a tool interface.

In addition, the parallel robot may have a housing, including an upper housing, a lower housing, and a flexible housing, where the upper housing is mounted outside the moving platform, the lower housing is mounted on the mounting base, and the flexible housing is arranged between the upper housing and the lower housing, so that the upper housing is movable relative to the lower housing. Preferably, the parallel robot in the present invention is in the shape of a conical frustum, and the diameter of the upper housing is smaller than the diameter of the lower housing.

Preferably, the first joint structure in the passive arm includes a first force amplification apparatus and a first locking element, the second joint structure includes a second force amplification apparatus and a second locking element, and the first driving mechanism and the second driving mechanism apply an acting force to the first locking element and/or the second locking element by the first force amplification apparatus and/or the second force amplification apparatus.

According to the passive arm in the present invention, the force amplification apparatuses are arranged in the joint structures, respectively. In a case where the driving apparatuses apply a same locking force, the force amplification apparatuses are added, so that the locking force of the passive arm is greatly increased and the requirements for larger load applications are met. Especially under a miniature condition of the passive arm, the passive arm can be locked electrically or pneumatically, which improves the use convenience of an operator compared with mechanical locking.

Optionally, the first driving mechanism is arranged in the upper arm and can simultaneously provide a driving force to two ends. For example, the first driving mechanism can simultaneously apply the acting force to a force receiving end of the first force amplification apparatus in the first joint structure at one end and a force receiving end of the second force amplification apparatus in the second joint structure at the other end. Optionally, the second driving mechanism is arranged in the front arm and can also simultaneously provide a driving force to two ends. For example, the second driving mechanism can simultaneously apply the acting force to the force receiving end of the first force amplification apparatus in the first joint structure at one end and the force receiving end of the second force amplification apparatus in the second joint structure at the other end. When both the first driving mechanism and the second driving mechanism apply the acting force to the force receiving end of the first force amplification apparatus in the first joint structure, two first force amplification apparatuses are arranged in the first joint structure, where the two first force amplification apparatuses are arranged on two sides of the first locking element, respectively. When either the first driving mechanism or the second driving mechanism applies the acting force to the force receiving end of the first force amplification apparatus in the first joint structure, one first force amplification apparatus is arranged in the first joint structure, where the first force amplification apparatus is arranged on one side of the first locking element and is close to one side of the corresponding driving apparatus that provides a driving force.

Further, the first joint structure includes: a first joint head and a second joint head; and an articulated shaft, where the first joint head and the second joint head are connected by the articulated shaft; the first locking element is arranged between the first joint head and the second joint head and is configured to lock the first joint head and the second joint head; and the first force amplification apparatus is arranged on one side and/or two sides of the first locking element and is configured to apply an amplified acting force to the first locking element.

Preferably, the first force amplification apparatus may be of a lever type structure. The lever type force amplification apparatus has a simple structure. By setting a proportional relationship between force arms, a multiple of force amplification is easily adjusted, and a force amplification effect is remarkable.

The first force amplification apparatus may include a first rotary shaft and a first force amplification rod, where a distance between a force receiving end of the first force amplification rod and the first rotary shaft is greater than a distance between a force applying end of the first force amplification rod and the first rotary shaft. Therefore, the acting force on the force receiving end may be amplified at the force applying end and then applied to the first locking element.

Optionally, one first force amplification apparatus may be arranged on one side of the first locking element, and has the force applying end abutting against one side of the first locking element and the force receiving end connected to the corresponding driving apparatus. Alternatively, one first force amplification apparatus may be arranged on each of two sides of the first locking element, and the force receiving end of each first force amplification apparatus is connected to a first driving apparatus or a second driving apparatus. Or optionally, the force receiving end of one of the first force amplification apparatuses is connected to the corresponding driving apparatus, and the force receiving end of the other one abuts against an inner wall of the corresponding joint head.

Preferably, the first locking element includes a plurality of friction plates sleeved on the articulated shaft. The friction plates may be made of a rubber material, and a coefficient of friction of the material and the number of friction plates may be selected according to a load that needs to be borne.

Optionally, one end of the articulated shaft may be fixedly arranged on one of the first joint head and the second joint head, and the other joint head is articulated on the articulated shaft, so that relative rotation between the first and second joint heads can be implemented. Alternatively, both the first joint head and the second joint head are articulated on the articulated shaft, and the two joint heads may both rotate about the articulated shaft and may rotate relative to each other. Those skilled in the art may choose a specific mounting form according to a requirement.

Preferably, the first joint structure includes a stop piece sleeved at an end of the articulated shaft and embedded at an end of the first joint head and/or an end of the second joint head. A connection manner for the stop piece allows for relative rotation between the first and second joint heads, while preventing the two joint heads from separating from the end of the articulated shaft.

Optionally, the first joint structure further includes a slide block sleeved on the articulated shaft and located between the first locking element and the first force amplification apparatus. The slide block is movable along the articulated shaft, and the force applying end of the first force amplification apparatus abuts against the slide block, which facilitates the uniform application of the acting force on the first locking element. The force applying end does not directly apply the acting force to the first locking element, which can prevent damage to the first locking element due to excessive local stress.

Preferably, an arc-shaped end surface protruding outwards is provided at the force applying end of the first force amplification rod. The arc-shaped end surface is in contact with the slide block, which makes it easier to generate relative movement and facilitates the application of the acting force; and the slide block is pushed to move along the articulated shaft, so as to press the first locking element tightly.

Further, the first joint structure further includes an ejector block slidably arranged in a cavity of the first joint head and/or a cavity of the second joint head. The ejector block has a bottom end in contact with the corresponding driving apparatus and a top end in contact with the force receiving end of the first force amplification apparatus. The ejector block is mainly configured to transfer an acting force of the corresponding driving apparatus to the force receiving end of the first force amplification apparatus. Preferably, the top end of the ejector block is in point contact with the force receiving end of the first force amplification apparatus. For example, the top end of the ejector block is of a spherical structure, and an arc-shaped end surface is provided at the force receiving end of the first force amplification apparatus, so that the point contact can be formed between the top end of the ejector block and the force receiving end of the first force amplification apparatus. The spherical structure and the arc-shaped end surface are in contact with each other and are prone to relative movement, so that the force receiving end of the first force amplification apparatus is caused to rotate about the rotary shaft to drive the force applying end to move towards the slide block or the first locking element, so as to apply the acting force.

Further, the second joint structure includes: a joint housing; and a third joint head arranged in the joint housing, where the second locking element is arranged in contact with the third joint head and is configured to lock the third joint head; and the second force amplification apparatus is arranged at one end of the second locking element and is configured to apply an amplified acting force to the second locking element.

Further, the second force amplification apparatus is of a lever type structure. The lever type force amplification apparatus has a simple structure. By setting a proportional relationship between force arms, a multiple of force amplification is easily adjusted, and a force amplification effect is remarkable.

Preferably, the second force amplification apparatus includes a second rotary shaft and a second force amplification rod arranged on the second rotary shaft, where a distance between a force receiving end of the second force amplification rod and the second rotary shaft is greater than a distance between a force applying end of the second force amplification rod and the second rotary shaft. The second rotary shaft may be arranged on the housing, so that the second force amplification rod may rotate about the second rotary shaft. A distance from the force receiving end to an articulated point is greater than a distance from the articulated point to the force applying end, which can amplify the acting force on the force receiving end and then apply a greater acting force to the locking element at the force applying end, thereby achieving a good locking effect.

More preferably, the second force amplification apparatus includes two second force amplification rods connected together by a second rotary shaft. For example, the two second force amplification rods are connected together by the second rotary shaft to form a structure similar to a form of scissors. In this case, the second rotary shaft does not need to be arranged on the housing.

Preferably, an arc-shaped end surface is provided at the force receiving end of the second force amplification rod. Cooperatively, an arc-shaped end surface is also provided at a portion, in contact with the force receiving end of the second force amplification rod, of the corresponding driving mechanism, and point contact can be formed between the arc-shaped end surface and the force receiving end of the second force amplification rod, which facilitates relative movement. In addition, the arc-shaped end surface may have a certain inclination angle or an inwards recessed radian, which can enable an end of the corresponding driving mechanism to make preset relative movement along the force receiving end of the second force amplification rod, resulting in preset rotation at the force receiving end of the second force amplification rod.

Preferably, an arc-shaped end surface protruding outwards is provided at the force applying end of the second force amplification rod. The arrangement of the arc-shaped end surface facilitates relative movement between the force applying end and the second locking element, so as to apply the amplified acting force to the second locking element. Moreover, the arrangement of the arc-shaped end surface protruding outwards can enable the force applying end to press the second locking element tightly during relative movement between the force applying end and the second locking element.

Preferably, a structure being at least partially spherical is provided at one end of the third joint head. A spherical structure being partially recessed inwards is provided at one end of the second locking element and cooperates with a portion in contact with the third joint head.

Preferably, a ball joint pin is provided at the other end of the third joint head and extends out of the joint housing. The ball joint pin can be configured to be connected to an auxiliary tool or a fixing tool.

Preferably, a plurality of U-shaped openings are provided on a side wall of the joint housing. The ball joint pin can rotate into the U-shaped openings, so as to expand the range of movement and degree of freedom of the ball joint pin.

The second joint structure in the present invention amplifies a locking force of a joint by the second force amplification apparatus, so that the second joint structure can be used for the passive arm and can also be used for a passive arm of a surgical robot.

Certainly, the above second joint structure may also be arranged only at one end of the passive arm.

Further, the driving mechanism may be one of a telescopic rod, an electric push rod, a lead screw, a hydraulic cylinder, and a pneumatic cylinder. Preferably, the driving mechanism is the electric push rod convenient for a user to control.

In addition, the first and second driving mechanisms may be controlled by external switches. The control apparatus may be connected to an exterior of the passive arm, and the switches (foot switches, key switches, or a group of switches) are arranged to send external signals to control the driving mechanisms. The driving mechanisms can provide thrusts to the joint structures at the two ends and the locking forces are amplified by the force amplification apparatuses, so that the joint structures are pushed to be quickly locked; and the switches may also control the driving mechanisms to retract, so that the thrusts are reduced to release the joints of the passive arm.

A tool interface is provided at the front end of the parallel robot in the present invention, so that various tools can be mounted to meet different surgical requirements. The tracer is mounted near the tool, and the accurate spatial position of the tool can be determined by the tracer, so that the tool can be used to implement precise punching, nailing, implantation, and other operations. The moving platform of the parallel robot in the present invention is suitable for small-range movement to adjust the accurate position of the tool at the front end, while large-range movement needs to be implemented in conjunction with the passive arm.

Preferably, the first joint structure of the passive arm in the present invention is configured to connect two arms to serve as a joint between the two arms. The second joint structures are arranged at two ends of the passive arm and are connected to a ball joint pin of the front arm and a connecting rod of the upper arm, respectively. During use, the first joint structure and the second joint structures are released first. In this case, the passive arm has multiple degrees of freedom, and the position of the parallel robot can be manually adjusted. After the parallel robot is adjusted to reach a suitable position, the driving mechanisms can quickly lock the passive arm and provide a larger locking load. Compared with conventional mechanical connection and locking, the advantages of more convenience in mounting and positioning, and faster locking are achieved.

Therefore, the parallel robot system according to the present invention implements high-precision navigation planning and precise positioning in combination with the advantages of high accuracy of small-range movement of the moving platform of the parallel robot by using the advantages of large movement range, high flexibility, simple operation, and one key locking of the passive arm. The parallel robot system according to the present invention is small in size and convenient to arrange, and can partially replace conventional surgical robots to complete surgical operations.

Optionally, the control apparatus may be arranged in the housing of the parallel robot. To further reduce the size, the control apparatus may also be arranged outside the parallel robot, and controls the parallel robot and the passive arm in a wired or wireless manner.

To make the objectives, technical solutions and advantages of the embodiments of the present invention clearer, the technical solutions in the embodiments of the present invention will be clearly and completely described below in conjunction with the accompanying drawings in the embodiments of the present invention. Apparently, the described embodiments are some rather than all of the embodiments of the present invention. All other embodiments obtained by those of ordinary skill in the art based on the embodiments of the present invention without creative efforts shall fall within the scope of protection of the present invention.

Figure 1:
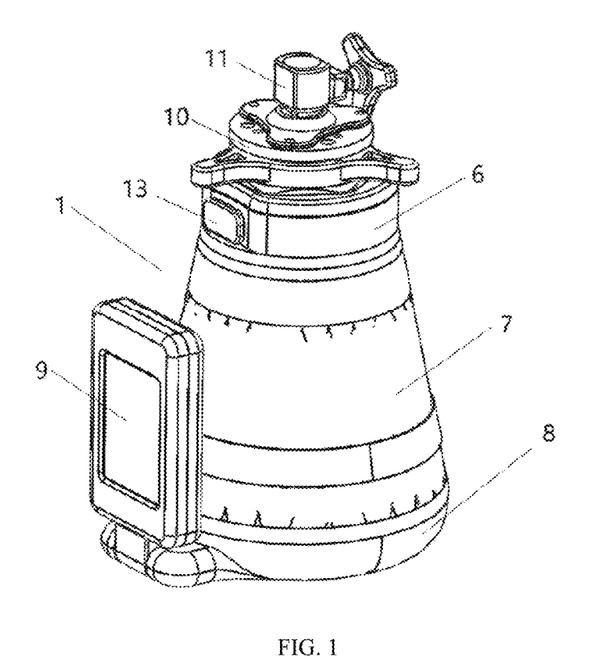
FIG. 1 is a schematic diagram of a parallel robot in an embodiment of the present invention.
Figure 2:
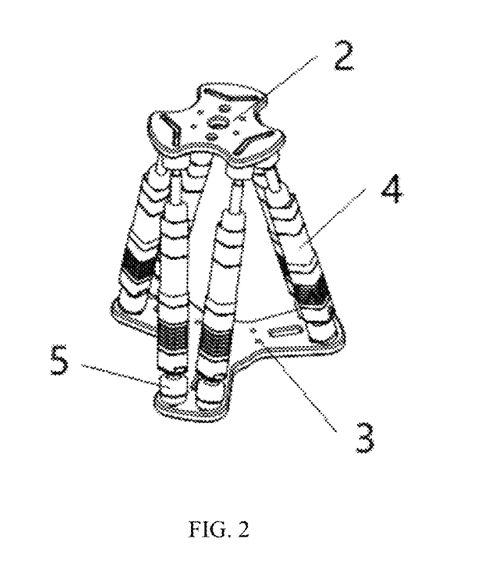
FIG. 2 is a schematic structural diagram of a moving platform with six degrees of freedom in the embodiment of the present invention.

As shown in FIG. 1 and FIG. 2, a parallel robot 1 in an embodiment of the present invention includes a six-degree-of-freedom moving platform, and an upper housing 6, a flexible housing 7, and a lower housing 8 arranged outside the six-degree-of-freedom moving platform, where the flexible housing 7 is connected between the upper housing 6 and the lower housing 8. In this embodiment, the parallel robot 1 is in the shape of a roughly conical frustum.

The six-degree-of-freedom moving platform includes a moving platform 2, a mounting base 3, and six telescopic apparatuses 4. The mounting base 3 and the moving platform 2 are of a star-shaped structure with three branches, and a support point is arranged on each branch, so that three support points are formed on the moving platform 2 and the mounting base 3, respectively, and the three support points are arranged in a triangular shape.

The six telescopic apparatuses 4 are grouped in pairs, and each group of the telescopic apparatuses 4 has one end articulated to one of the three support points of the mounting base 3 and the other end articulated to adjacent two of the support points of the moving platform 2, respectively, so that the two telescopic apparatuses 4 in each group are arranged in a triangular shape.

In this embodiment, the six-degree-of-freedom movement range of the moving platform 2 is as follows:
horizontal movement:
X direction [40 mm, −34 mm]
Y direction [35 mm, −35 mm]
Z direction [16 mm, −13 mm]
rotation:
X direction [25°, −25°]
Y direction [25°, −25°]

Z direction [64°, −64°]

Figure 3:
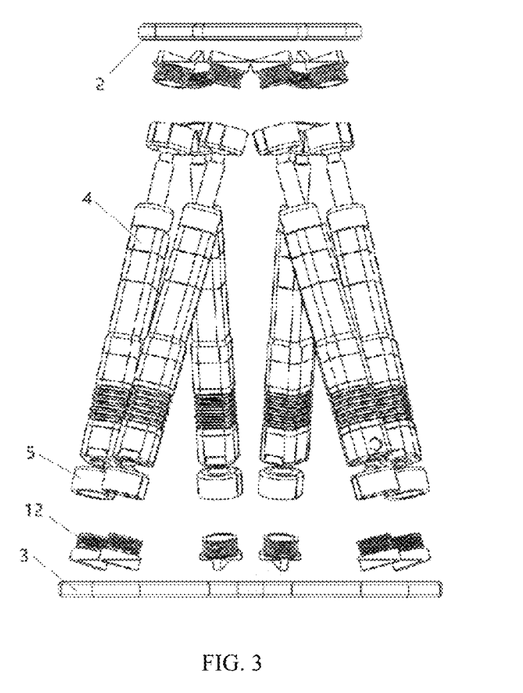
FIG. 3 is a schematic exploded view of the moving platform with the six degrees of freedom in the embodiment of the present invention.

As shown in FIG. 3, in this embodiment, the telescopic apparatus 4 is an electric push rod, ball joint hinges 5 are arranged at two ends of the electric push rod, a lower end of a base of the ball joint hinge 5 is open and is provided with an internal thread, mounting lead screws 12 are arranged on the moving platform 2 and the mounting base 3, and the base of the ball joint hinge 5 is connected to the mounting lead screw 12 in a threaded manner, so that the telescopic apparatus 4 is articulated to the mounting base 3 and the moving platform 2.

The parallel robot 1 in this embodiment further includes a display screen 9 having one end arranged on the mounting base 3 and preferably capable of rotating an angle relative to the mounting base 3. The display screen 9 is electrically connected to a control apparatus and configured to display a working state of the parallel robot 1 or to display prompt information. The prompt information may include, but is not limited to, target position information, planned path information, etc.

The parallel robot 1 further includes a control switch 13 electrically connected to the control apparatus and configured to start or stop the work of the parallel robot 1. The control switch 13 is arranged on the upper housing 6, which facilitates a thumb to operate the control switch 13 when an operator holds a front end of the parallel robot 1 with one hand. The control switch 13 may also control the locking and release of a passive arm 17.

The parallel robot 1 further includes a tool interface 10 located on the moving platform 2. The tool interface 10 may be a quick insertion interface, making it convenient to be connected to various tools or adapters. For example, a connecting piece 11 may be connected to the tool interface 10 and may be connected to a surgical tool, a tracer, and other apparatus.

Figure 4:
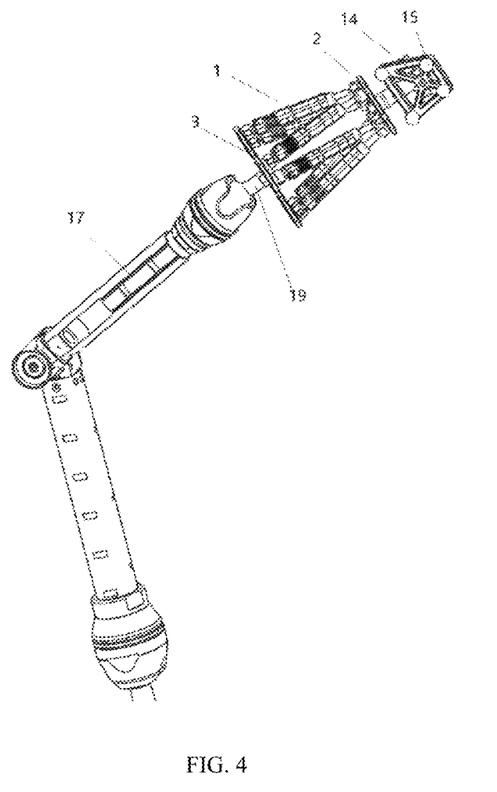
FIG. 4 is a schematic diagram of connection between a passive arm and the parallel robot in the embodiment of the present invention.

As shown in FIG. 4, the parallel robot 1 is mounted on the passive arm 17, and the mounting base 3 of the parallel robot 1 is mounted on a ball joint pin 19 of a front arm of the passive arm 17. The tracer is arranged on the moving platform 2 and includes a bracket 14 and optical indication points 15. In this embodiment, the bracket 14 is a polygonal frame provided with four optical indication points 15 being four small balls reflecting light. The four optical indication points 15 are arranged in a same plane, but not on a same straight line.

Figure 5:
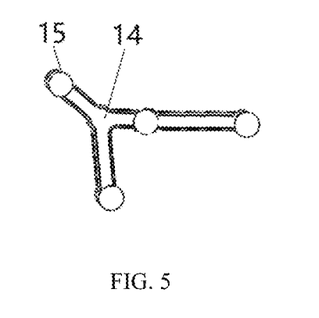
FIG. 5 is a schematic structural diagram of a tracer in the embodiment of the present invention.

As shown in FIG. 5, the bracket 14 may be a star-shaped bracket provided with four optical indication points 15 being four small balls reflecting light. A diameter of the optical indication points 15 is 10 mm. The four optical indication points 15 meet the requirements that a distance between two points is not less than 30 mm and a distance difference is not less than 5 mm.

Figure 6:
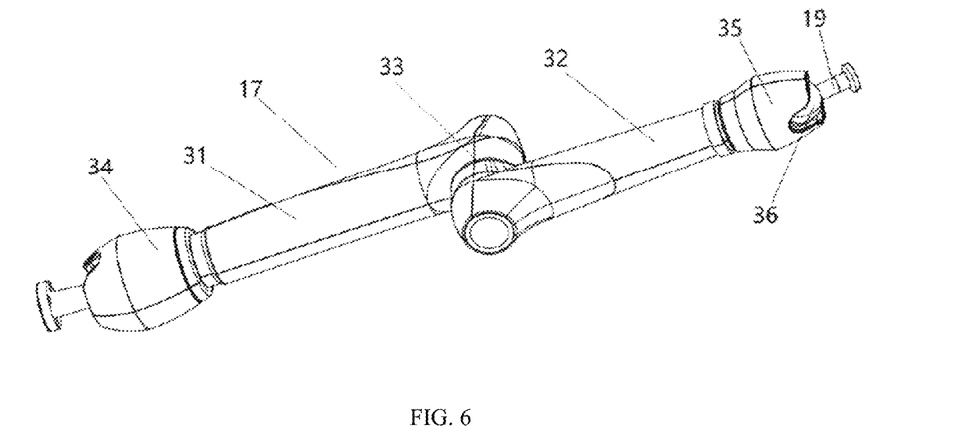
FIG. 6 is a schematic structural diagram of the passive arm in the embodiment of the present invention.
Figure 7:
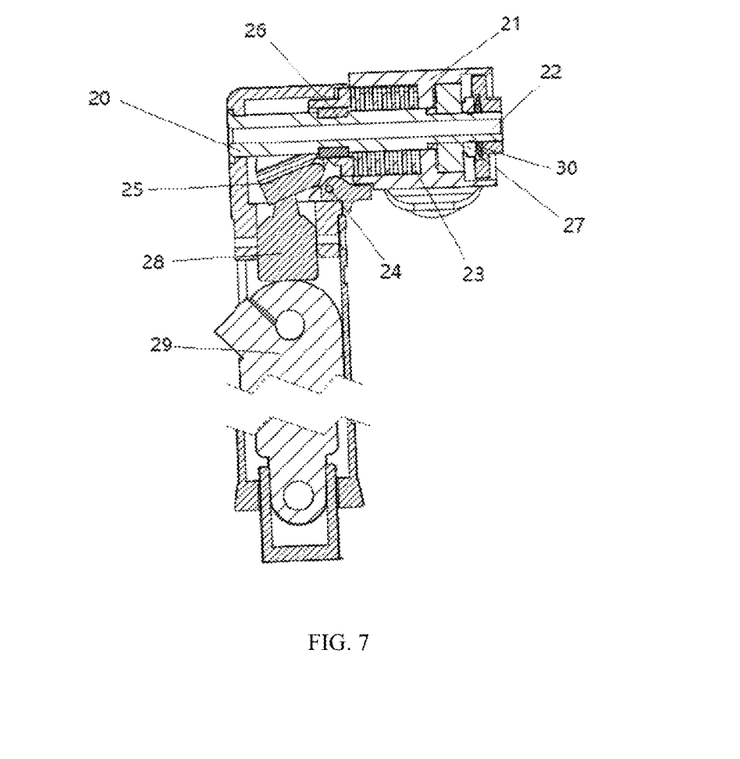
FIG. 7 is a sectional view of a first joint structure of the passive arm in the embodiment of the present invention.

As shown in FIG. 6 and FIG. 7, the passive arm 17 in the embodiment of the present invention includes an upper arm 31 and a front arm 32, a first joint structure 33 is arranged between the upper arm 31 and the front arm 32, a first joint head 20 is arranged at an end of the upper arm 31, and a second joint head 21 is arranged at an end of the front arm 32. The first joint head 20 and the second joint head 21 are articulated together by an articulated shaft 22, thereby allowing for relative rotation between the first joint head 20 and the second joint head 21.

The articulated shaft 22 is fixedly arranged on the first joint head 20, the second joint head 21 is articulated on the articulated shaft 22, and a stop piece 27 is arranged at an end of the articulated shaft 22, embedded in a groove at an end of the second joint head 21, and configured to prevent the second joint head 21 from falling off the articulated shaft 22.

In this embodiment, a spring 30 is arranged at the end of the articulated shaft 22. The spring 30 is sleeved on the articulated shaft 22, has two ends abutting against an end of the stop piece 27 and the end of the second joint head 21, respectively, and can provide a pre-pressure between the first joint head 20 and the second joint head 21, so that the joints will not excessively relax in an unlocked state.

A first locking element 23 is arranged between the first joint head 20 and the second joint head 21. In this embodiment, a plurality of friction plates are used as the first locking element 23 and are sleeved on the articulated shaft 22.

The first joint structure 33 in this embodiment further includes a first force amplification apparatus. In this embodiment, the first force amplification apparatus is of a lever type structure, and includes a first force amplification rod 25 and a first rotary shaft 24, where two ends of the first rotary shaft 24 may be arranged on inner walls of the joint heads, and the first force amplification rod 25 can rotate about the first rotary shaft 24. A distance from a force receiving end of the first force amplification rod 25 to the first rotary shaft 24 is greater than a distance from a force applying end of the first force amplification rod 25 to the first rotary shaft 24. In this embodiment, one first force amplification apparatus is arranged in the first joint head 20.

The first joint structure 33 in this embodiment further includes a slide block 26 sleeved on the articulated shaft 22 and located between the first force amplification apparatus and the first locking element 23. The force applying end of the first force amplification rod 25 abuts against the slide block 26 and uniformly applies an acting force to the first locking element 23 by the slide block 26. A first driving apparatus 29 is arranged in the upper arm 31. In this embodiment, an electric push rod is used as the first driving apparatus 29. An ejector block 28 is arranged at a top end of the driving apparatus 29, and a top of the ejector block 28 is spherical and abuts against the force receiving end of the first force amplification rod 25.

When the first joint structure 33 needs to be locked, the driving apparatus 29 rotates, the ejector block 28 moves towards the force receiving end of the first force amplification rod 25, the force receiving end of the first force amplification rod 25 receives the acting force and then rotates about the first rotary shaft 24, the force applying end of the first force amplification rod 25 applies an amplified acting force to an end of the slide block 26, the slide block 26 moves (without rotation) along the articulated shaft 22, and a locking force is applied to a surface of the first locking element 23, so as to lock the first joint structure 33. In this case, there is no rotation between the first joint head 20 and the second joint head 21. When the first joint structure 33 needs to be released, the electric push rod rotates reversely, and the ejector block 28 moves in a direction away from the force receiving end of the first force amplification rod 25, to reduce or cancel the acting force applied to the force receiving end of the first force amplification rod 25, so as to reduce or cancel the acting force on the end of the slide block 26. In this case, the first joint head 20 and the second joint head 21 are unlocked and can rotate relatively.

Preferably, the first force amplification rod 25 is of a sheet structure, and an arc-shaped end surface recessed inwards may be provided at the force receiving end of the first force amplification rod. Cooperatively, an end of the ejector block 28 is a spherical surface, so that point contact can be formed between the ejector block 28 and the force receiving end of the first force amplification rod 25, which facilitates relative movement. Moreover, an end surface of the force receiving end of the first force amplification rod 25 may have a certain inclination angle, so that the end of the ejector block 28 can easily make relative movement along the force receiving end of the first force amplification rod 25 when moving towards the first force amplification rod 25. Preferably, an arc-shaped end surface protruding outwards is provided at the force applying end of the first force amplification rod 25. The arrangement of the arc-shaped end surface facilitates relative movement between the force applying end and the slide block 26, so as to apply the amplified acting force to the first locking element 23.

Figure 8:
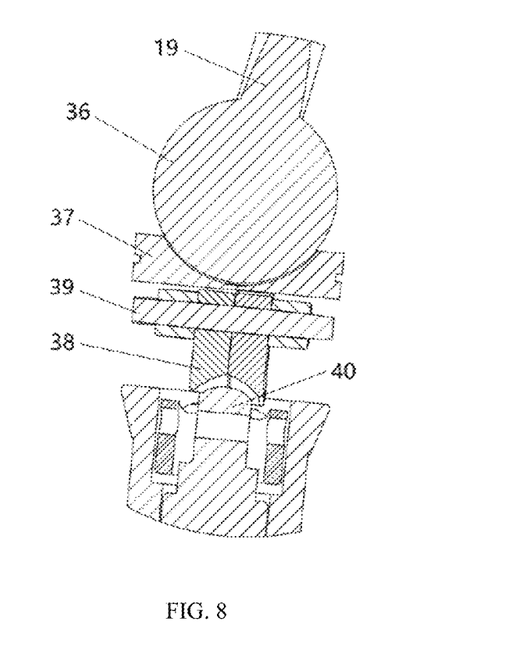
FIG. 8 is a sectional view of a second joint structure of the passive arm in the embodiment of the present invention, and shows a sectional view of connection between a second force amplification apparatus and a driving apparatus.

As shown in FIG. 8, second joint structures 34 in this embodiment are arranged at the end of the upper arm 31 and the end of the front arm 32, and each includes a ball joint housing 35 and a ball joint 36, where one spherical end of the ball joint 36 is rotatably arranged in the ball joint housing 35, and a ball joint pin 19 is arranged at the other end of the ball joint 36 and configured to be connected to the mounting base 3 of the parallel robot 1. The ball joint housing 35 is provided with an opening for the ball joint pin 19 to penetrate through, and has a U-shaped opening, which expands the range of movement of the ball joint pin 19. The joint structure further includes a ball bowl 37 arranged on the spherical end of the ball joint 36, where the ball bowl 37 has a partially inwards recessed spherical surface matched in shape with the ball joint 36.

The second joint structure 34 in this embodiment further includes a second force amplification apparatus. In this embodiment, the second force amplification apparatus is of a lever type structure, and includes a pair of second force amplification rods 38 articulated together by a second rotary shaft 39. A force applying end of the second force amplification rod 38 is close to an end of the ball bowl 37 and is used to apply an acting force to the ball bowl 37. A force receiving end of the second force amplification rod 38 is in contact with a raised head of a second driving apparatus 40. The driving apparatus is an electric push rod arranged in a passive arm housing.

When the second joint structure 34 needs to be locked, the electric push rod rotates, the second driving apparatus 40 moves towards the force receiving end of the second force amplification rod 38, the force receiving end of the second force amplification rod 38 receives the acting force and then amplifies the acting force by a lever, the force applying end of the second force amplification rod 38 applies an amplified acting force to the end of the ball bowl 37, the ball bowl 37 applies a locking force to a surface of the ball joint 36, so as to lock the second joint structure 34. When the second joint structure 34 needs to be released, the electric push rod rotates reversely, and the raised head of the second driving apparatus 40 moves in a direction away from the force receiving end of the second force amplification rod 38, to reduce or cancel the acting force applied to the force receiving end of the second force amplification rod 38, so as to reduce or cancel the acting force on the end of the ball bowl 37. In this case, the ball joint 36 is movable relative to the ball bowl 37.

In this embodiment, as shown in figure, the second force amplification rod 38 is of a sheet structure, and an arc-shaped end surface recessed inwards is provided at the force receiving end of the second force amplification rod. Cooperatively, an end of the raised head of the second driving apparatus 40 is a spherical surface, so that point contact can be formed between the raised head and the force receiving end of the second force amplification rod 38, which facilitates relative movement.

Moreover, an end surface of the force receiving end of the second force amplification rod 38 may have a certain inclination angle, so that the end of the raised head can easily make relative movement along the force receiving end of the second force amplification rod 38 when moving towards the second force amplification rod 38; and the force receiving ends of the two second force amplification rods 38 get away from each other, so that the movement closer to the ball bowls 37 is produced at the force applying ends of the two second force amplification rods 38, and the amplified acting force is applied to the ball bowls 37. In this embodiment, an arc-shaped end surface protruding outwards is provided at the force applying end of the second force amplification rod 38. The arrangement of the arc-shaped end surface facilitates relative movement between the force applying end and the ball bowl 37, so as to apply the amplified acting force to the ball bowl 37.

In this embodiment, the spherical second joint structure 34 in the passive arm 17 has three degrees of freedom. Therefore, the passive arm provided with the second joint structures 34 is flexible to operate and movable in a large range when configured to be connected to the parallel robot 1.

Figure 9:
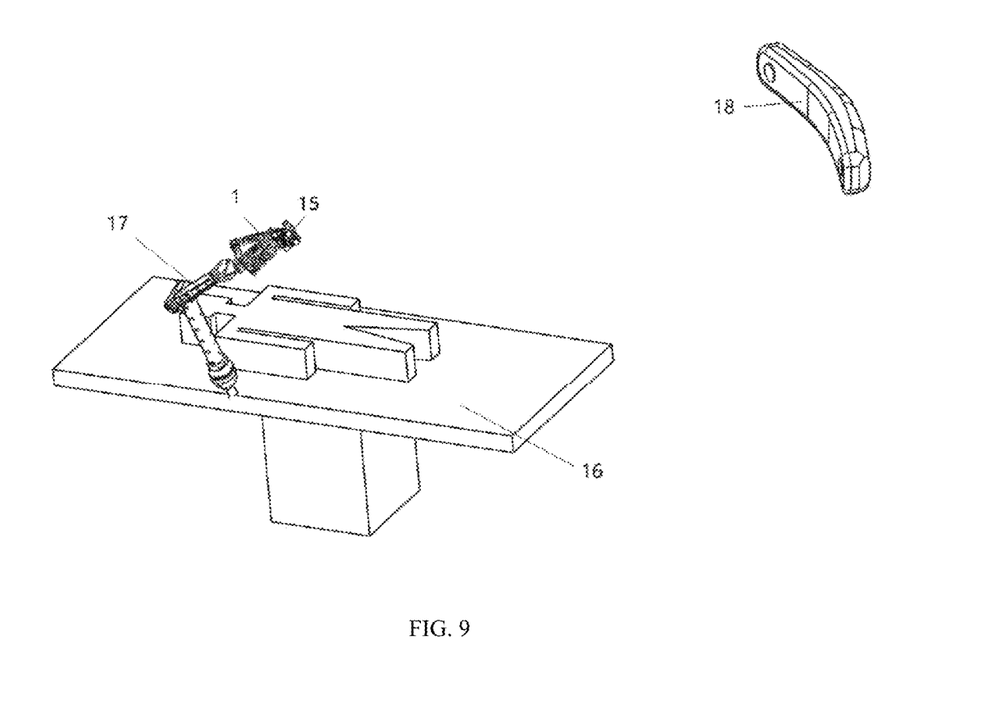
FIG. 9 is a schematic diagram of a parallel robot system according to the embodiment of the present invention.

FIG. 9 shows a schematic diagram of use of a parallel robot system according to the present invention. The parallel robot 1 is connected to one end of the passive arm 17, and the other end of the passive arm 17 is arranged on an operating table 16. The optical indication points 15 of the tracer are arranged at the front end of the parallel robot 1, and an optical positioning and tracking apparatus 18 can photograph the optical indication points 15, so that the position of the front end of the parallel robot 1, that is, the position of the surgical tool can be precisely tracked.

A working process of the parallel robot system is described by taking an example of completing the arrangement of a guide needle by using the parallel robot system in this embodiment below.

Firstly, spatial coordinates of an arrangement position of the guide needle are determined. The operator holds the parallel robot 1 in hand, releases the passive arm 17, moves the parallel robot 1 to an area close to the arrangement position of the guide needle, and then locks the passive arm 17. The optical positioning and tracking apparatus 18 can photograph the optical indication points 15 of the tracer, so that a spatial position of a tool at the front end of the parallel robot 1 can be tracked in real time. Therefore, the control apparatus locates the position of the front end of the tool to the spatial coordinates of the arrangement position of the guide needle and calculates the movement and attitude required for the moving platform 2 of the parallel robot 1 to move the tool to a target position. The parallel robot 1 is started, and the moving platform 2 is driven by the driving apparatuses to move the tool to the arrangement position of the guide needle. In this case, the tool can automatically or assist the operator in completing the arrangement operation of the guide needle. During the operation, the moving platform 2 of the parallel robot 1 can be locked to be maintained in a predetermined position, or the moving platform 2 of the parallel robot 1 can be started to dynamically adjust its attitude to be maintained in a predetermined position, so as to prevent position offset during the operation.

Finally, it should be noted that the above embodiments are merely used to illustrate the technical solutions of the present invention, but not to limit them; although the present invention has been described in detail with reference to the above-mentioned embodiments, those of ordinary skill in the art should understand that: they may still make modifications to the technical solutions described in the above-mentioned embodiments, or make equivalent substitutions to some of the technical features; and these modifications or substitutions do not make the essence of the corresponding technical solutions depart from the spirit and scope of the technical solutions of the embodiments of the present invention.

The invention claimed is:

1. A parallel robot system, comprising:
   a control apparatus;
   a parallel robot, comprising a mounting base, a moving platform, and a driving apparatus arranged between the mounting base and the moving platform, wherein the driving apparatus is configured to drive the moving platform to make multi-degree-of-freedom movement relative to the mounting base, and the driving apparatus receives a control signal from the control apparatus;
   a tracer, arranged on the moving platform;
   a passive arm, wherein the mounting base of the parallel robot is connected to one end of the passive arm; and
   an optical positioning and tracking apparatus, configured to track a spatial position of the tracer in real time and to send spatial position data of the tracer to the control apparatus;
   wherein the passive arm comprises:
   an upper arm and a front arm;
   a first joint structure, wherein the upper arm and the front arm are articulated together by the first joint structure;
   a second joint structure, arranged at an end of the upper arm and/or an end of the front arm;
   a first driving mechanism, arranged in the upper arm; and
   a second driving mechanism, arranged in the front arm,
   wherein the mounting base of the parallel robot is connected to the end of the front arm of the passive arm;
   the first driving mechanism and the second driving mechanism are electric push rods and are electrically connected to the control apparatus.

2. The parallel robot system according to claim 1, wherein the first joint structure comprises a first force amplification apparatus and a first locking element, the second joint structure comprises a second force amplification apparatus and a second locking element, and the first driving mechanism and the second driving mechanism apply an acting force to the first locking element and/or the second locking element by the first force amplification apparatus and/or the second force amplification apparatus.

3. The parallel robot system according to claim 2, wherein the first force amplification apparatus and/or the second force amplification apparatus are/is of a lever structure.

4. The parallel robot system according to claim 1, wherein the driving apparatus comprises six telescopic apparatuses;
   three support points are formed on the mounting base and the moving platform, respectively, and the three support points are arranged in a triangular shape; and
   the six telescopic apparatuses are grouped in pairs, and each group of the telescopic apparatuses has one end articulated to one of the three support points of the mounting base and the other end articulated to adjacent two of the support points of the moving platform, respectively, and is arranged in a triangular shape.

5. The parallel robot system according to claim 4, wherein the telescopic apparatuses are electric push rods, each of the electric push rods comprises a micro servo motor, and the micro servo motor is electrically connected to the control apparatus.

6. The parallel robot system according to claim 1, further comprising a display screen arranged on the parallel robot and electrically connected to the control apparatus.

7. The parallel robot system according to claim 1, wherein the tracer comprises a bracket and a plurality of optical indication points arranged on the bracket.

8. The parallel robot system according to claim 7, wherein the plurality of optical indication points are small balls emitting or reflecting light and are located on a same plane; and
   the plurality of optical indication points meet the requirements that a distance between two points is not less than 30 mm and a distance difference is not less than 5 mm.

* * * * *